C. P. MARSHALL AND J. W. BRAGGER.
DIFFRACTING SCREEN.
APPLICATION FILED MAR. 15, 1920.
1,433,637.
Patented Oct. 31, 1922.
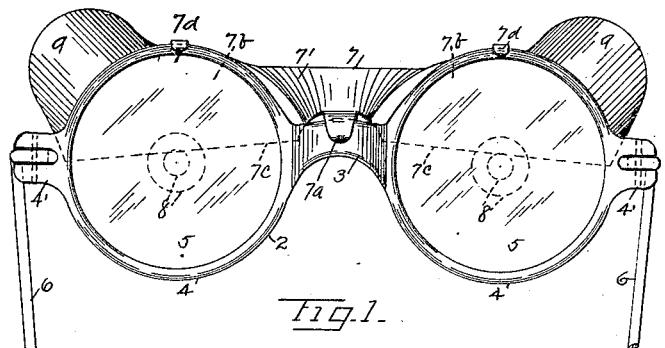
Fig. 1.
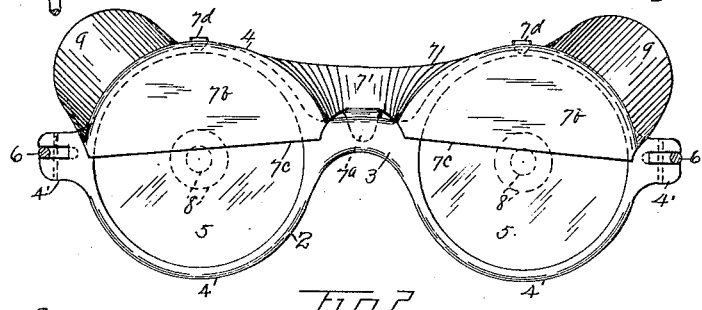
Fig. 2.
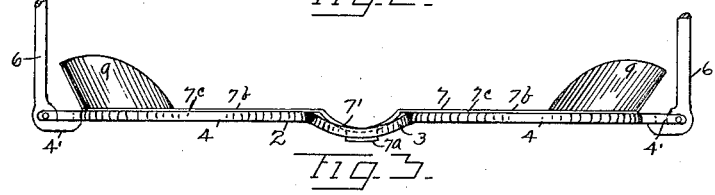
Fig. 3.
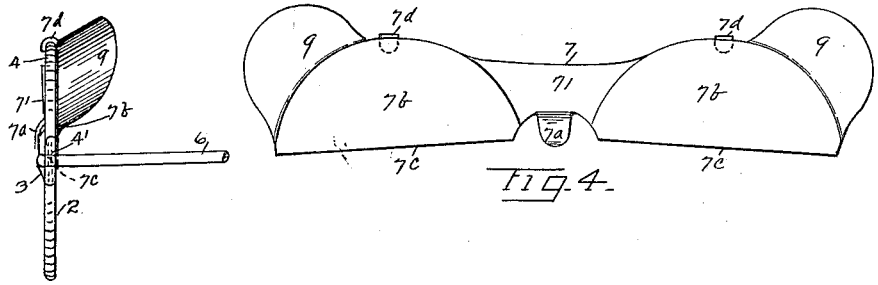
Fig. 4.
Fig. 5.
INVENTORS.
Charles P. Marshall.
John W. Bragger.
BY
Harry D. Wallace
ATTORNEY.

Patented Oct. 31, 1922.

1,433,637

UNITED STATES PATENT OFFICE.

CHARLES P. MARSHALL AND JOHN W. BRAGGER, OF WATERTOWN, NEW YORK.

DIFFRACTING SCREEN.

Application filed March 15, 1920. Serial No. 366,090.

*To all whom it may concern:*

Be it known that we, CHARLES P. MARSHALL and JOHN W. BRAGGER, citizens of the United States, residing at Watertown, in the county of Jefferson and State of New York, have invented certain new and useful Improvements in Diffracting Screens, of which the following is a specification.

This invention relates to diffracting screens, designed to be worn by the users for eliminating the glare of bright lights.

The object of the invention is to provide novel, simple and effective means for removing or dimming the glare of electric and other bright lights, such as the headlights of automobiles, arc-lights, and the like, and consists of a screen, which is preferably made out of a suitable thin, light and opaque substance in one part. A further object is to provide a diffracting screen which may be supported by any suitable means, as by the frames of spectacles, goggles, or similar devices, or the screens may be an integral part of the frames. When supported by spectacle frames, the screen is preferably disposed between the eyes and the frame, and the diffracting edges of the screen are preferably disposed slightly above and also at a slight angle to the horizontal axis of the eyes. And a particular object is to provide a screen of the class, which effectually obscures those direct rays of light, which without the screen, invariably penetrate the upper half of the eyes and effect the annoying dazzle and glare. The lower edges of the screen diffracts the light, by producing a fringe of rays that extend downwardly across the pupils of the eyes, and reduces the illumination of the objects which are visible just beneath the edges of the screen though still preserving the sharp outlines of the objects. Thus the excessive dazzling of a bright light is dimmed by the aforesaid fringing of the rays, with the result that the outlines of the objects may be plainly seen without the customary blinding effect. A person wearing this novel diffracting screen may look directly at the head-light of an approaching automobile, without being unpleasantly affected by its dazzle, and he may therefore effect a safe passing of the other vehicle.

We attain these objects by the means set forth in the detailed description which follows, and as illustrated by the accompanying drawing, in which—

Figure 1 is a front side view of a pair of spectacles, to which our improvement is applied. Fig. 2 is a rear side view of the same. Fig. 3 is a bottom edge view of the screen and its support. Fig. 4 is a front side view of the screen. And Fig. 5 is an end elevation of the device and its support.

In the drawing, our diffracting screen is shown detachably mounted upon the frame 2, of a pair of goggles or spectacles, such as is commonly worn by drivers and passengers of automobiles. The frame 2 consists of the usual nose-piece or bridge 3, to the opposite ends of which are integrally joined the circular rims 4, which support the usual lenses 5. The rims 4 are each provided with lateral forked projections 4', to which bows 6 are pivoted.

7 designates generally our diffracting screen, which consists of a single piece or body of an opaque material, which may be formed-up by the use of suitable dies, or the said body may be molded or pressed into the desired shape and contour. 7' is the nose-piece which corresponds to the bridge 3 of the frame, the said part being provided at its lower edge with a depending clip or tongue $7^a$, which engages one face of the bridge 3 for holding the medial portion of the screen in place. $7^b$ designates similar plane portions, which are substantially semi-circular, and extend in opposite directions laterally from the bridge 7', and preferably over-lap and closely contact the inner sides of the rims 4. The lower margins $7^c$ are preferably straight and sharp, and these are also preferably arranged at a slight angle to the horizontal axis of the lenses 5, and the eyes (indicated by the dotted circles 8), of the wearer. The edges $7^c$ are preferably disposed slightly above the said horizontal axis, as shown in Figs. 1 and 2. This disposition and arrangement being found by practical experience to produce the most satisfactory results. At the top margins of the planes $7^b$ are provided similar clips $7^d$, which hook over the corresponding edges of the rims 4, and coact with the clip $7^a$ for firmly holding the screen in place. 9 designates similar integral wing or ear like portions which extend upwardly and outwardly from the top margins of the plane portions $7^b$, for preventing extraneous light from filtering in between the screen and the brows of forehead of the wearer to interfere with the diffracting of the rays of light which emanate from a head-light, or other source.

Our diffracting screen, as shown and described, is intended to be worn, the same as spectacles, and preferably is detachably applied to the latter, which obviates the necessity of providing a separate support. By disposing the opaque screen between the eyes and the frame of the spectacles, the diffracting edges 7c are positioned within the plane of the shortest focal distance or range, and modify the light which passes the said edges, by apparently bending the luminous rays and causing them to penetrate into the shadow. This produces a series of alternate dark and light bands or fringes which blend or fade off into each other, and effects a pronounced dimming of the excessive dazzle which bright lights ordinarily produce, with the result that the wearer may look directly at an approaching head-light, or arc-light, and even plainly trace the outlines of the bulb and filament, or the electrodes of the arc, without being unpleasantly or injuriously affected thereby. Thus the driver of an automobile may plainly observe the outline and accurately judge the position of an approaching car, whose headlights project a bright and dazzling light, and effect a safe passing of the other vehicle. The screen may be instantly and readily trained upon an approaching light, by simply tipping the head slightly upwardly or downwardly, thus leaving the wearer's hands free to steer or otherwise control and operate the car. The screen 7 may be worn in day-time without inconvenience or annoyance and is useful for shading the eyes from the dazzle and glare of the sunlight.

Having thus described our invention, what we claim, is—

1. A diffracting screen adapted to be supported by a pair of spectacles, comprising two similar semi-circular plane portions connected and spaced by an integral curved nose-piece the said nose-piece extending upwardly sufficiently to prevent light from entering between the ends of the plane portions, each plane portion having a clip for gripping the corresponding rim of the spectacle frame and a diffracting margin which inclines slightly relatively to the horizontal axis of the eyes of the wearer, and said nose-piece having a similar clip for gripping the nose-piece of the spectacle frame for holding the semi-circular screens in a common plane.

2. A diffracting screen for attachment to the frame of spectacles, comprising similar opaque semi-circular plane portions adapted to overlay the top portions of the spectacle lenses and having integral clips for gripping the spectacle rims, said plane portions connected and spaced by an integral curved nose-piece, the top margin of said nose-piece being disposed substantially in line with the top margins of said plane portions for preventing the light from entering between the adjacent ends of said plane portions, and the diffracting margins of said plane portions being disposed at an angle to the horizontal axis of the eyes of the wearer.

In testimony whereof we affix our signatures.

CHARLES P. MARSHALL.
JOHN W. BRAGGER.